US010495482B2

United States Patent
Dong et al.

(10) Patent No.: US 10,495,482 B2
(45) Date of Patent: Dec. 3, 2019

(54) METHOD, APPARATUS AND COMPUTER STORAGE MEDIUM FOR IMPROVING PERFORMANCE OF RELATIVE POSITION SENSOR

(71) Applicant: Ninebot (Beijing) Tech. Co., Ltd, Beijing (CN)

(72) Inventors: Shiqian Dong, Beijing (CN); Guanjiao Ren, Beijing (CN)

(73) Assignee: Ninebot (Beijing) Tech. Co., Ltd, Beijing (CN)

( * ) Notice: Subject to any disclaimer, the term of this patent is extended or adjusted under 35 U.S.C. 154(b) by 386 days.

(21) Appl. No.: 15/325,832

(22) PCT Filed: Oct. 8, 2016

(86) PCT No.: PCT/CN2016/101442
§ 371 (c)(1),
(2) Date: Jan. 12, 2017

(87) PCT Pub. No.: WO2018/014449
PCT Pub. Date: Jan. 25, 2018

(65) Prior Publication Data
US 2018/0180445 A1 Jun. 28, 2018

(30) Foreign Application Priority Data

Jul. 19, 2016 (CN) .......................... 2016 1 0569714

(51) Int. Cl.
*G01C 25/00* (2006.01)
*G06F 17/13* (2006.01)
*G01C 21/16* (2006.01)

(52) U.S. Cl.
CPC .......... *G01C 25/00* (2013.01); *G01C 21/165* (2013.01); *G01C 25/005* (2013.01); *G06F 17/13* (2013.01)

(58) Field of Classification Search
CPC ........ G01C 25/00; G01C 25/005; G06F 17/13
See application file for complete search history.

(56) References Cited

U.S. PATENT DOCUMENTS 6,474,159 B1 * 11/2002 Foxlin .................. A61B 5/1114
73/488
8,756,995 B2 6/2014 Tzidon et al.
(Continued)

FOREIGN PATENT DOCUMENTS

CN 1737580 A 2/2006
CN 102171628 A 8/2011
(Continued)

OTHER PUBLICATIONS

International Search Report in international application No. PCT/CN2016/101442, dated May 2, 2017,4 pgs.
(Continued)

*Primary Examiner* — Sujoy K Kundu
*Assistant Examiner* — L. Anderson
(74) *Attorney, Agent, or Firm* — Cooper Legal Group, LLC

(57) ABSTRACT

The disclosure discloses a method, apparatus and a computer storage medium for improving performance of a relative position sensor, applied to a measurement apparatus. The measurement apparatus is configured to measure a relative position between a measured object and the measurement apparatus. A relative position sensor and a first auxiliary sensor are disposed on the measurement apparatus. A second auxiliary sensor is disposed on the measured object. The method includes the steps as follows. First measurement data measured by a relative position sensor is acquired, and second measurement data measured by a first auxiliary sensor and a second auxiliary sensor is acquired. An Extended Kalman Filter (EKF) is constructed on the basis of the first measurement data and the second measurement data. The first measurement data is corrected by using the EKF. The disclosure achieves the technical effect of increasing the accuracy of measurement data of a relative position sensor so as to improve dynamic performance of the relative position sensor.

11 Claims, 2 Drawing Sheets

(56) References Cited

U.S. PATENT DOCUMENTS

| | | |
|---|---|---|
| 9,146,134 B2 | 9/2015 | Lokshin |
| 9,261,980 B2 | 2/2016 | Bassompiere |
| 2002/0194914 A1 | 12/2002 | Foxlin |
| 2009/0228204 A1* | 9/2009 | Zavoli .................... G01C 21/30 701/532 |
| 2009/0278791 A1 | 11/2009 | Slycke |
| 2011/0199298 A1 | 8/2011 | Bassompiere |
| 2011/0208473 A1 | 8/2011 | Bassompiere |
| 2011/0209544 A1 | 9/2011 | Tzidon |
| 2012/0116716 A1 | 5/2012 | Lokshin |
| 2013/0297250 A1 | 11/2013 | Tzidon et al. |
| 2014/0298906 A1 | 10/2014 | Tzidon et al. |

FOREIGN PATENT DOCUMENTS

| | | |
|---|---|---|
| CN | 102308183 A | 1/2012 |
| CN | 103134489 A | 6/2013 |
| CN | 103149939 A | 6/2013 |
| CN | 103221788 A | 7/2013 |
| CN | 104111058 A | 10/2014 |
| CN | 104656665 A | 5/2015 |
| CN | 104730533 A | 6/2015 |
| CN | 105651242 A | 6/2016 |
| CN | 105698765 A | 6/2016 |
| EP | 1782076 A1 | 5/2007 |
| WO | 2008155961 A1 | 12/2008 |

OTHER PUBLICATIONS

The Written Opinion of the International Search Authority in international application No. PCT/CN2016/101442, dated May 2, 2017, 5 pgs.

Supplementary European Search Report in the European application No. 16909376.2, dated Apr. 26, 2019 21 pgs.

* cited by examiner

METHOD, APPARATUS AND COMPUTER STORAGE MEDIUM FOR IMPROVING PERFORMANCE OF RELATIVE POSITION SENSOR

TECHNICAL FIELD

The disclosure relates to the field of electronic technology, and in particular to a method, apparatus and a computer storage medium for improving performance of a relative position sensor.

BACKGROUND

A relative position sensor is configured to measure a relative position (e.g., a relative angle and a relative distance) between two objects, is widely applied to the field of robots, and may be used for tracking the measured objects.

However, performance of current relative position sensors are commonly poor, and measurement data are likely to fluctuate due to interference, which may cause that the measurement data is inaccurate and dynamic performance are poor, thus severely affecting application of relative position measurement sensors.

In conclusion, how to improve performance of a relative position sensor has become a problem to be urgently solved at the present stage.

SUMMARY

The embodiments of the disclosure provide a method, apparatus and a computer storage medium for improving performance of a relative position sensor, capable of solving the technical problems of inaccurate measurement data and poor dynamic performance caused by the fact that measurement data of a relative position sensor is likely to fluctuate due to interference in the conventional art.

According to one aspect, one embodiment of the disclosure provides the technical solution as follows.

A method for improving performance of a relative position sensor may be applied to a measurement apparatus. The measurement apparatus may be configured to measure a relative position between a measured object and the measurement apparatus. A relative position sensor and a first auxiliary sensor may be disposed on the measurement apparatus. A second auxiliary sensor may be disposed on the measured object. The method may include the steps as follows.

First measurement data measured by a relative position sensor is acquired, and second measurement data measured by a first auxiliary sensor and a second auxiliary sensor is acquired.

An Extended Kalman Filter (EKF) is constructed on the basis of the first measurement data and the second measurement data.

The first measurement data is corrected by using the EKF.

In the above solution, the first measurement data may include:

a relative angle $s_m^\alpha$ between the measurement apparatus and the measured object, and a relative distance $s_m^\rho$ between the measurement apparatus and the measured object.

In the above solution, the second measurement data may include:

a component $a_{t\_m}^x$ of an acceleration of the measured object in an X axis, and a component $a_{t\_m}^y$ of the acceleration of the measured object in a Y axis;

a forward speed $v_{s\_m}^v$ of the measurement apparatus, and a rotation speed $v_{s\_m}^\omega$ of the measurement apparatus; and an angle $\theta_s$ between a positive direction of the measurement apparatus and the Earth's magnetic north pole, and an angle $\theta_t$ between a positive direction of the measured object and the Earth's magnetic north pole.

In the above solution, before the EKF is constructed on the basis of the first measurement data and the second measurement data, the method may further include the step as follows.

A system consisting of the measurement apparatus and the measured object is mathematically modelled to obtain a mathematical model:

$$\begin{cases} \dot{v}_t^x = a_{t\_m}^x - b_t^x \\ \dot{v}_t^y = a_{t\_m}^y - b_t^y \\ \dot{s}_m^\alpha = r_s^\omega v_{s\_m}^\omega + \dfrac{v_{s\_p}^y - v_{t\_p}^y}{s_m^\rho} \\ \dot{s}_m^\rho = v_{s\_p}^x + v_{t\_p}^x \\ \begin{bmatrix} v_{t\_p}^x \\ v_{t\_p}^y \end{bmatrix} = T(s_m^\alpha - \theta_s - \theta_t) \begin{bmatrix} v_t^x \\ v_t^y \end{bmatrix}, \\ \begin{bmatrix} v_{sp}^x \\ v_{sp}^y \end{bmatrix} = r \begin{bmatrix} v_t^x \cos s_m^\alpha \\ v_t^y \sin s_m^\alpha \end{bmatrix} \\ \dot{b}_t^x = 0 \\ \dot{b}_t^y = 0 \\ \dot{r}_s^\omega = 0 \\ \dot{r}_s^v = 0 \end{cases}$$

where $b_t^x$ is a bias of the acceleration of the measured object in the X axis, and $b_t^y$ is a bias of the acceleration of the measured object in the Y axis;

$r_s^v$ is a ratio of a forward speed, measured by the first auxiliary sensor, of the measurement apparatus to an actual forward speed of the measurement apparatus, and $r_s^\omega$ is a ratio of a rotation speed, measured by the first auxiliary sensor, of the measurement apparatus to an actual rotation speed of the measurement apparatus;

$v_t^x$ is a component of a speed, along a pointing direction of the second auxiliary sensor, of the measured object in the X axis, and $v_t^y$ is a component of the speed, along the pointing direction of the second auxiliary sensor, of the measured object in the Y axis;

$v_{s\_p}^x$ is a magnitude of a projection of a forward speed vector of the measurement apparatus onto a direction of a radius vector of the measurement apparatus and the measured object, and $v_{s\_p}^y$ is a magnitude of a projection of the forward speed vector of the measurement apparatus onto a direction normal to the radius vector direction of the measurement apparatus and the measured object;

$v_{t\_p}^x$ is a magnitude of a projection of a speed vector of the measured object onto a direction of a radius vector connecting the measurement apparatus and the measured object, and $v_{t\_p}^y$ is a magnitude of a projection of the speed vector of the measured object onto a direction normal to the radius vector direction connecting the measurement apparatus and the measured object; and $T(\bullet)$ is a rotation transformation matrix in a two-dimensional space, which represents that a vector post-multiplied the rotation transformation matrix is rotated anticlockwise by $(\bullet)$.

In the above solution, the step of constructing the EKF on the basis of the first measurement data and the second measurement data may include the steps as follows.

A state variable ($x=[v_t^x, v_t^y, s^\alpha, v^\rho, b_t^x, b_t^y, r_s^v, r_s^\omega)]^T$) is constructed.

An input variable ($u=[a_{t\_m}^x, a_{t\_m}^y, v_{s\_m}^v, v_{s\_m}^\omega, \theta_s, \theta_t]^T$) is constructed.

On the basis of the state variable and the input variable, the mathematical model is adjusted to the following expression, so as to obtain the EKF:

$$\begin{cases} \dot{x} = f(x, u, ti) \\ y = h(x, v, ti) \\ v \sim (0, R) \end{cases}$$

where $v$ is a measurement noise vector fitting Gaussian distribution having a mean value of 0 and a covariance of R, ti is time, $\dot{x}=f(x, u, ti)$ is a differential equation model of the system, $y=[s_m^\alpha, s_m^\rho]$ is an output of the system, and h is a measurement matrix.

In the above solution, the step of correcting the first measurement data by using the EKF may include the steps as follows.

The EKF is initialized.

The first measurement data is corrected by executing a recursive algorithm, so as to obtain optimal state estimations for $s_m^\alpha$ and $s_m^\rho$.

In the above solution, the EKF may be initialized on the basis of the following equations:

$$\hat{x}=E[x(0)]$$

$$P(0)=E[(x(0)-\hat{x}(0))(x(0)-\hat{x}(0))^T],$$

where $\hat{x}(0)$ is an estimation value of an initial state x(0) of the system, P(0) is a transition probability matrix of the state of the system, and E[•] represents an expectation of •.

In the above solution, the first measurement data may be corrected by executing the recursive algorithm on the basis of the following equation:

$$\dot{\hat{x}}=f(\hat{x},y,ti)+K[y_m-h(x,v_0,ti)],$$

where K is continuously updated in accordance with the following equations:

$$\tilde{R} = M(\hat{x})RM(\hat{x})$$

$$K = RC^T(\hat{x})\tilde{R}^{-1}$$

$$\dot{P} = A(\hat{x})P + PA^T(\hat{x}) - PC^T(\hat{x})\tilde{R}^{-1}CP$$

where $$A = \frac{\partial f}{\partial x}\bigg|_{x=x_0}$$

$$C = \frac{\partial h}{\partial x}\bigg|_{x=x_0}$$

$$M = \frac{\partial h}{\partial v}\bigg|_{x=x_0};$$

$\dot{\hat{x}}$ is a derivative of an estimation value of a variable of the state of the system; K is a correction amplitude by which the state of a simulation system is corrected according to an error between the simulation system and an actual system; $y_m$ is a measurement result containing noise, including the relative distance $s_m^\rho$ and the relative angle $s_m^\alpha$ output by the relative position sensor; $\tilde{R}$ is an intermediate variable; P is a propagation probability matrix; and $\dot{P}$ is a derivative of the propagation probability matrix.

According to another aspect, another embodiment of the disclosure provides the technical solution as follows.

A measurement apparatus may be configured to measure a relative position between a measured object and the measurement apparatus. A relative position sensor and a first auxiliary sensor may be disposed on the measurement apparatus. A second auxiliary sensor may be disposed on the measured object. The measurement apparatus may include:

an acquisition unit configured to acquire first measurement data measured by a relative position sensor, and acquire second measurement data measured by a first auxiliary sensor and a second auxiliary sensor;

a construction unit configured to construct an EKF on the basis of the first measurement data and the second measurement data; and a correction unit configured to correct the first measurement data by using the EKF.

In the above solution, the first measurement data may include:

a component $a_{t\_m}^x$ of an acceleration of the measured object in an X axis, and a component $a_{t\_m}^y$ of the acceleration of the measured object in a Y axis;

a forward speed $v_{s\_m}^v$ of the measurement apparatus, and a rotation speed $v_{s\_m}^\omega$ of the measurement apparatus; and an angle $\theta_s$ between a positive direction of the measurement apparatus and the Earth's magnetic north pole, and an angle $\theta_t$ between a positive direction of the measured object and the Earth's magnetic north pole.

In the above solution, before the EKF is constructed on the basis of the first measurement data and the second measurement data, the method further includes the steps as follows.

a system consisting of the measurement apparatus and the measured object may be mathematically modelled to obtain a mathematical model:

$$\begin{cases} \dot{v}_t^x = a_{t\_m}^x - b_t^x \\ \dot{v}_t^y = a_{t\_m}^y - b_t^y \\ \dot{s}_m^\alpha = r_s^\omega v_{s\_m}^\omega + \frac{v_{s\_p}^y - v_{t\_p}^y}{s_m^\rho} \\ \dot{s}_m^\rho = v_{s\_p}^x + v_{t\_p}^x \\ \begin{bmatrix} v_{t\_p}^x \\ v_{t\_p}^y \end{bmatrix} = T(s_m^\alpha - \theta_s - \theta_t)\begin{bmatrix} v_t^x \\ v_t^y \end{bmatrix}, \\ \begin{bmatrix} v_{sp}^x \\ v_{sp}^y \end{bmatrix} = r\begin{bmatrix} v_t^x\cos s_m^\alpha \\ v_t^y\sin s_m^\alpha \end{bmatrix} \\ \dot{b}_t^x = 0 \\ \dot{b}_t^y = 0 \\ \dot{r}_s^\omega = 0 \\ \dot{r}_s^v = 0 \end{cases}$$

where $b_t^x$ is a bias of the acceleration of the measured object in the X axis, and $b_t^y$ is a bias of the acceleration of the measured object in the Y axis;

$r_s^v$ is a ratio of a forward speed, measured by the first auxiliary sensor, of the measurement apparatus to an actual forward speed of the measurement apparatus, and $r_s^\omega$ is a ratio of a rotation speed, measured by the first auxiliary sensor, of the measurement apparatus to an actual rotation speed of the measurement apparatus;

$v_t^x$ is a component of a speed, along a pointing direction of the second auxiliary sensor, of the measured object in the X axis, and $v_t^y$ is a component of the speed, along the pointing direction of the second auxiliary sensor, of the measured object in the Y axis;

$v_{s\_p}^x$ is a magnitude of a projection of a forward speed vector of the measurement apparatus onto a direction of a radius vector of the measurement apparatus and the measured object, and $v_{s\_p}^y$ is a magnitude of a projection of the forward speed vector of the measurement apparatus onto a direction normal to the radius vector direction of the measurement apparatus and the measured object;

$v_{t\_p}^x$ is a magnitude of a projection of a speed vector of the measured object onto a direction of a radius vector connecting the measurement apparatus and the measured object, and $v_{t\_p}^y$ is a magnitude of a projection of the speed vector of the measured object onto a direction normal to the radius vector direction connecting the measurement apparatus and the measured object; and T(•) is a rotation transformation matrix in a two-dimensional space, which represents that a vector post-multiplied the rotation transformation matrix is rotated anticlockwise by (•).

In the above solution, the construction unit may be specifically configured to:

construct a state variable (x=[$v_t^x$, $v_t^y$, $s^\alpha$, $v^\rho$, $b_t^x$, $b_t^y$, $r_s^v$, $r_s^\omega$)]$^T$);

construct an input variable (u=[$a_{t\_m}^x$, $a_{t\_m}^y$, $v_{s\_m}^v$, $v_{s\_m}^\omega$, $\theta_s$, $\theta_t$]$^T$); and adjust, on the basis of the state variable and the input variable, the mathematical model to the following expression, so as to obtain the EKF:

$$\begin{cases} \dot{x} = f(x, u, ti) \\ y = h(x, v, ti) \\ v \sim (0, R) \end{cases}$$

where v is a measurement noise vector fitting Gaussian distribution having a mean value of 0 and a covariance of R, ti is time, $\dot{x}$=f(x, u, ti) is a differential equation model of the system, y=[$s_m^\alpha$, $s_m^\rho$] is an output of the system, and h is a measurement matrix.

In the above solution, the correction unit may be specifically configured to:

correct the first measurement data by executing a recursive algorithm, so as to obtain optimal state estimations for $s_m^\alpha$ and $s_m^\rho$.

In the above solution, the correction unit may be specifically configured to initialize the EKF on the basis of the following equations:

$\hat{x}=E[x(0)]$ $P(0)=E[(x(0)-\hat{x}(0))(x(0)-\hat{x}(0))^T]$, where $\hat{x}(0)$ is an estimation value of an initial state x(0) of the system, P(0) is a transition probability matrix of the state of the system, and E[•] represents an expectation of •.

In the above solution, the correction unit may be specifically configured to correct the first measurement data by executing the recursive algorithm on the basis of the following equation:

$\dot{\hat{x}}=f(\hat{x},y,ti)+K[y_m-h(x,v_0,ti)]$, where K is continuously updated in accordance with the following equations:

$\tilde{R} = M(\hat{x})RM(\hat{x})$ $K = RC^T(\hat{x})\tilde{R}^{-1}$ $\dot{P} = A(\hat{x})P + PA^T(\hat{x}) - PC^T(\hat{x})\tilde{R}^{-1}CP$ where $A = \frac{\partial f}{\partial x}\bigg|_{x=x_0}$ $C = \frac{\partial h}{\partial x}\bigg|_{x=x_0}$ $M = \frac{\partial h}{\partial v}\bigg|_{x=x_0}$;

$\dot{\hat{x}}$ is a derivative of an estimation value of a variable of the state of the system; K is a correction amplitude by which the state of a simulation system is corrected according to an error between the simulation system and an actual system; $y_m$ is a measurement result containing noise, including the relative distance $s_m^\rho$ and the relative angle $s_m^\alpha$ output by the relative position sensor; $\tilde{R}$ is an intermediate variable; P is a propagation probability matrix; and $\dot{P}$ is a derivative of the propagation probability matrix.

Another embodiment of the disclosure provides a computer storage medium storing computer-executable instructions that may be configured to:

acquire first measurement data measured by a relative position sensor, and acquire second measurement data measured by a first auxiliary sensor and a second auxiliary sensor;

construct an EKF on the basis of the first measurement data and the second measurement data; and correct the first measurement data by using the EKF.

One or more technical solutions provided in the embodiments of the disclosure at least have the technical effects or advantages as follows.

In the embodiments of the disclosure, a method, apparatus and a computer storage medium for improving performance of a relative position sensor are disclosed. They are applied to a measurement apparatus. First measurement data measured by a relative position sensor is acquired, and second measurement data measured by a first auxiliary sensor and a second auxiliary sensor is acquired. An EKF is constructed on the basis of the first measurement data and the second measurement data. The first measurement data is corrected by using the EKF. Since the first measurement data measured by the relative position sensor is corrected by using the EKF, the technical problems of inaccurate measurement data and poor dynamic performance caused by the fact that measurement data of the relative position sensor is likely to fluctuate due to interference in the conventional art are effectively solved, thereby achieving the technical effect of increasing the accuracy of measurement data of the relative position sensor so as to improve dynamic performance of the relative position sensor.

BRIEF DESCRIPTION OF THE DRAWINGS

In order to more clearly illustrate the technical solutions in the embodiments of the disclosure, drawings required for describing the embodiments will be simply introduced. Apparently, the drawings described below are only some embodiments of the disclosure. On the premise of no creative work, those skilled in the art can obtain other drawings according to these drawings.

DETAILED DESCRIPTION

Figure 1:
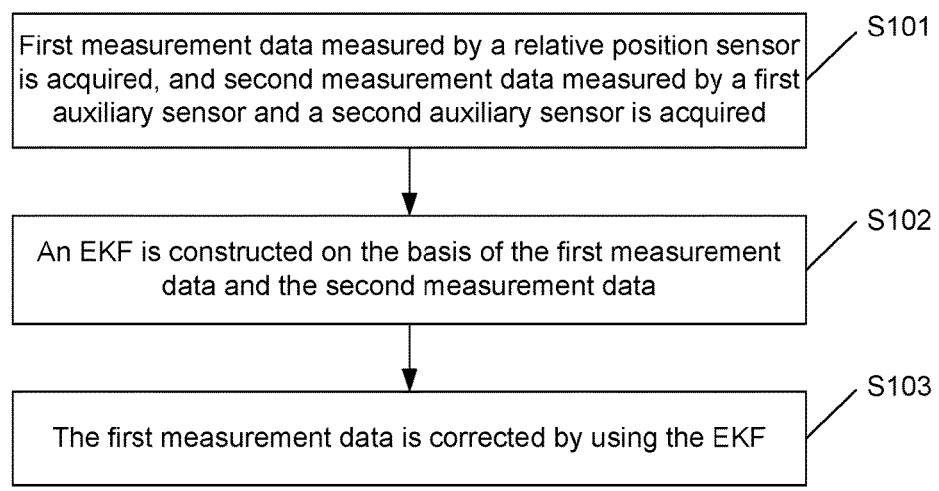
FIG. 1 is a flowchart showing a method for improving performance of a relative position sensor according to an embodiment of the disclosure.

The embodiments of the disclosure provide a method and apparatus for improving performance of a relative position sensor, capable of solving the technical problems of inaccurate measurement data and poor dynamic performance caused by the fact that measurement data of the relative position sensor is likely to fluctuate due to interference in the conventional art.

To solve the technical problems, the concept of the technical solution in the embodiments of the disclosure is as follows.

A method for improving performance of a relative position sensor is applied to a measurement apparatus. The measurement apparatus is configured to measure a relative position between a measured object and the measurement apparatus. A relative position sensor and a first auxiliary sensor are disposed on the measurement apparatus. A second auxiliary sensor is disposed on the measured object. The method includes the steps as follows. First measurement data measured by a relative position sensor is acquired, and second measurement data measured by a first auxiliary sensor and a second auxiliary sensor is acquired. An EKF is constructed on the basis of the first measurement data and the second measurement data. The first measurement data is corrected by using the EKF.

In order to better understand the above technical solution, the above technical solution will be elaborated below in conjunction with the drawings of the specification and specific implementations.

It is to be noted that terms 'and/or' appearing herein are only an association relation for describing associated objects, which represents that three relations may exist. For example, A and/or B may represent three situations that A independently exists, A and B simultaneously exist, and B independently exists. In addition, a character '/' herein generally represents that associated objects are in an 'or' relation.

Embodiment 1

This embodiment provides a method for improving performance of a relative position sensor, applied to a measurement apparatus. The measurement apparatus is configured to measure a relative position between a measured object and the measurement apparatus, wherein a relative position sensor and a first auxiliary sensor are disposed on the measurement apparatus, and a second auxiliary sensor is disposed on the measured object.

In a specific implementation process, the measurement apparatus may be a device such as a ground robot, a self-balance car, an unmanned aerial vehicle or an electric vehicle. Here, the specific type of the measurement apparatus is not specifically limited in this embodiment.

In a specific implementation process, the measured object may be a stationary person or object.

In a specific implementation process, a positioning apparatus may be disposed on the measured object (or the measured object carries the positioning apparatus), the second auxiliary sensor is disposed in the positioning apparatus, and the measurement apparatus actually measures a relative position between the positioning apparatus and the measurement apparatus, wherein the positioning apparatus may be a smart phone, a pad, a remote control key, fitness equipment, a personal digital assistant or a game console.

In a specific implementation process, an Inertial Measurement Unit (IMU) is an electronic system consisting of one or more acceleration sensors and angular speed sensors, a microprocessor and a peripheral circuit.

In the embodiment of the disclosure, the first auxiliary sensor or the second auxiliary sensor includes: the IMU (integrated with a gyroscope, an accelerometer, an electronic compass and other devices), a speed measurement sensor (e.g., a coded disc or a light flow sensor), and the like. Generally, the gyroscope, the accelerometer and the electronic compass may be regarded as IMUs.

As shown in FIG. 1, the method for improving performance of a relative position sensor includes the steps as follows.

In Step S101, first measurement data measured by a relative position sensor is acquired, and second measurement data measured by a first auxiliary sensor and a second auxiliary sensor is acquired.

In a specific implementation process, the first measurement data includes:

a relative angle $s_m^a$ between the measurement apparatus and the measured object, and a relative distance $s_m^p$ between the measurement apparatus and the measured object. Here, $s_m^a$ and $s_m^p$ are noise-containing data measured by the relative position sensor disposed on the measurement apparatus.

Figure 2:
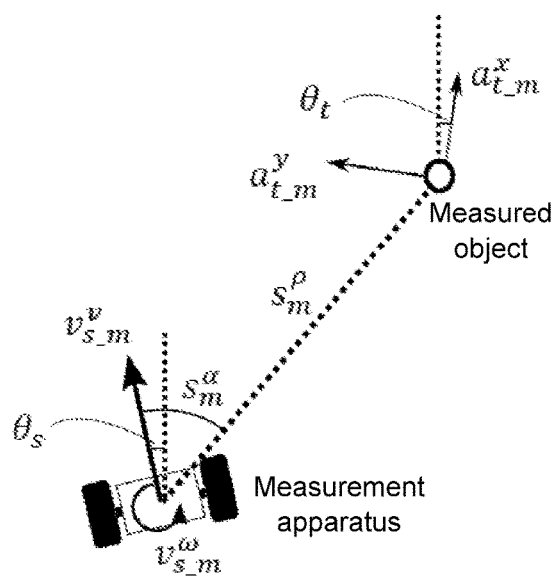
FIGS. 2 and 3 are schematic views illustrating a model of a system consisting of a measurement apparatus and a measured object according to an embodiment of the disclosure.
Figure 3:
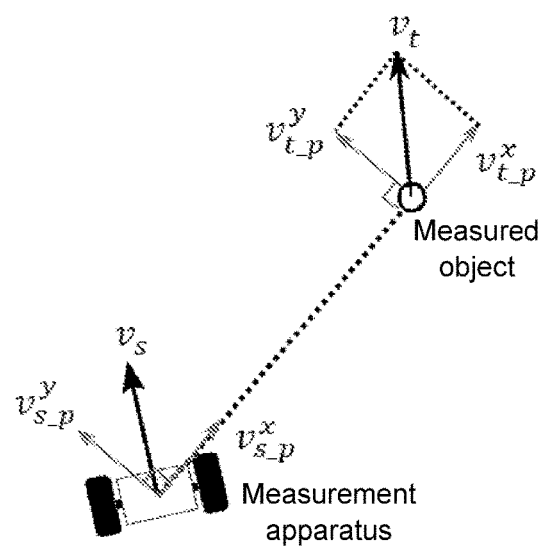

In a specific implementation process, as shown in FIGS. 2 and 3, the second measurement data includes:

a component $a_{t\_m}^x$ of an acceleration of the measured object in an X axis, and a component $a_{t\_m}^y$ of the acceleration of the measured object in a Y axis, wherein $a_{t\_m}^x$ and $a_{t\_m}^y$ are noise-containing data measured by the second auxiliary sensor (e.g., a gyroscope and/or an accelerometer) disposed on the measured object;

a forward speed $v_{s\_m}^v$ of the measurement apparatus, and a rotation speed $v_{s\_m}^\omega$ of the measurement apparatus, which are noise-containing data measured by the first auxiliary sensor (e.g., a coded disc) disposed on the measurement apparatus; and an angle $\theta_s$ between a positive direction of the measurement apparatus and the Earth's magnetic north pole, and an angle $\theta_t$ between a positive direction of the measured object and the Earth's magnetic north pole, where $\theta_s$ is data measured by the first auxiliary sensor (e.g., an electronic compass) disposed on the measurement apparatus, and $\theta_t$ is data measured by the second auxiliary sensor (e.g., an electronic compass) disposed on the measured object.

In a specific implementation process, the measurement apparatus may communicate with a positioning apparatus on the measured object by using a wireless communication technology, so as to acquire the data measured by the second auxiliary sensor. The wireless communication technology may be an Ultra Wideband (UWB) technology, a Wireless Fidelity (WiFi) technology, a Bluetooth technology or the like.

In Step S102, an EKF is constructed on the basis of the first measurement data and the second measurement data.

The EKF (Extended Kalman Filter) is a nonlinear system optimal state estimator, which can obtain a measurement result having accuracy higher than that of a single sensor by combining measurement data of a plurality of sensors which are linear or nonlinear and inaccurate. Essentially, the EKF is a recursive least square method.

In the embodiment of the disclosure, when the relative position sensor measures the relative position between the measured object and the measurement apparatus, the first measurement data and the second measurement data are combined by using the EKF to correct the first measurement data, so as to increase the accuracy, precision and dynamic performance of the relative position sensor.

As an optional implementation, before Step S102, the method further includes the steps as follows.

A system consisting of the measurement apparatus and the measured object is mathematically modelled to obtain a mathematical model:

$$\begin{cases} \dot{v}_t^x = a_{t\_m}^x - b_t^x \\ \dot{v}_t^y = a_{t\_m}^y - b_t^y \\ \dot{s}_m^\alpha = r_s^\omega v_{s\_m}^\omega + \dfrac{v_{s\_p}^y - v_{t\_p}^y}{s_m^\rho} \\ \dot{s}_m^\rho = v_{s\_p}^x + v_{t\_p}^x \\ \begin{bmatrix} v_{t\_p}^x \\ v_{t\_p}^y \end{bmatrix} = T(s_m^\alpha - \theta_s - \theta_t) \begin{bmatrix} v_t^x \\ v_t^y \end{bmatrix} \\ \begin{bmatrix} v_{sp}^x \\ v_{sp}^y \end{bmatrix} = r_s^v \begin{bmatrix} v_t^x \cos s_m^\alpha \\ v_t^y \sin s_m^\alpha \end{bmatrix} \\ \dot{b}_t^x = 0 \\ \dot{b}_t^y = 0 \\ \dot{r}_s^\omega = 0 \\ \dot{r}_s^v = 0 \end{cases} \quad \text{equation (1)}$$

where $b_t^x$ is a bias of the acceleration of the measured object in the X axis, and $b_t^y$ is a bias of the acceleration of the measured object in the Y axis.

$r_s^v$ is a ratio of a forward speed, measured by the first auxiliary sensor (e.g., a coded disc or a light flow sensor), of the measurement apparatus to an actual forward speed of the measurement apparatus. And $r_s^\omega$ is a ratio of a rotation speed, measured by the first auxiliary sensor (e.g., the coded disc or the light flow sensor), of the measurement apparatus to an actual rotation speed of the measurement apparatus. Here, generally, $r_s^v$ and $r_s^\omega$ are not equal to 1, are correlated to a wheel diameter and interval of the measurement apparatus, and can reflect the change in the geometric size of the measurement apparatus.

$v_t^x$ is a component of a speed, along a pointing direction of the second auxiliary sensor (e.g., an IMU disposed on the measured object), of the measured object in the X axis. And $v_t^y$ is a component of the speed, along the pointing direction of the second auxiliary sensor (e.g., the IMU disposed on the measured object), of the measured object in the Y axis ($v_t^x$ coincides with $a_{t\_m}^x$ in FIG. 2, and $v_t^y$ coincides with $a_{t\_m}^y$ in FIG. 2).

$v_{s\_p}^x$ is a magnitude of a projection of a forward speed vector of the measurement apparatus onto a direction of a radius vector of the measurement apparatus and the measured object, and $v_{s\_p}^y$ is a magnitude of a projection of the forward speed vector of the measurement apparatus onto a direction normal to the radius vector direction of the measurement apparatus and the measured object.

$v_{t\_p}^x$ is a magnitude of a projection of a speed vector of the measured object onto a direction of a radius vector connecting the measurement apparatus and the measured object, and $v_{t\_p}^y$ is a magnitude of a projection of the speed vector of the measured object onto a direction normal to the radius vector direction connecting the measurement apparatus and the measured object.

T(•) is a rotation transformation matrix in a two-dimensional space, which represents that a vector post-multiplied the rotation transformation matrix is rotated anticlockwise by (•).

In a specific implementation process, the EKF may be substantially implemented by two steps as follows.

The first step is prediction.

An established model based on a system difference equation/differential equation is equivalent to 'simulation' of a corresponding system in a real world. If a series of input quantities (or called as 'driving forces') of this simulation system is given, the state of the simulation system will continuously change. Since the simulation system has perfectly modelled an actual system and the driving forces 'drive' the actual system to run while 'driving' the state of the simulation system to be updated, the state change of the model and the state change of the actual system are almost simultaneous and identical. Therefore, before the state of the actual system is collected by using various sensors (i.e., the relative position sensor, the first auxiliary sensor and the second auxiliary sensor), the system state may have been acquired from the simulation system, which is called as 'state prediction'. Conventionally, a system state equation is linear. When the EKF is applied to nonlinear system state prediction, first-order Taylor expansion is performed on a nonlinear system at a current state to obtain an approximate system state update differential equation.

The second step is correction.

Under ideal conditions, state feedback control may be supposed to be directly performed using a prediction value in the first step. However, two problems may exist in reality. The first one is a problem of initial value indeterminacy, and the second one is a problem of modelling inaccuracy. The two problems will make the state of the simulation system deviate from an actual state gradually. In order to solve the problems, in this embodiment, the EKF continuously corrects the state of the simulation system by using a difference value between an actual system output collected by the relative position sensor and an output of the simulation system. Since the data collected by the relative position sensor has errors, the magnitude of the correction meets a criterion of making it optimally estimated after calculation. That is, a variance of the noise caused by the noise in the magnitude of the correction in the output of the simulation system is minimized.

From the above two-step algorithm, it can be seen that the EKF is an algorithm which depends on system modelling and indirectly estimates the system state using the second measurement data. Due to the existence of the system model and an optimal estimation method, compared with a method for filtering data of a relative position sensor using a Finite Impulse Response (FIR) filter, an Infinite Impulse Response (IIR) filter and the like, the EKF has the advantages of real-time response and high accuracy, and may further increase the accuracy by combining data of a plurality of sensors.

As an optional implementation, the step of constructing the extended Kalman filter on the basis of the first measurement data and the second measurement data includes the steps as follows.

Firstly, a state variable ($x=[v_t^x, v_t^y, s^\alpha, v^\rho, b_t^x, b_t^y, r_s^v, r_s^\omega)]^T$) is constructed.

Here, a real speed of a measured target (i.e., $v_t^x$, $v_t^y$) and a real relative position (a real relative angle $s^\alpha$ between the measurement apparatus and the measured object, and a real relative distance $s^p$ between the measurement apparatus and the measured object) of the measured target are taken as state variables to be observed. In addition, the time-varying bias of an inertial sensor and the change in the geometric size of the measurement apparatus (e.g., the change in the geometric size of a body of a self-balance car) are taken as variable to be observed. Such complete modelling may greatly increase the accuracy of the measurement.

Then, an input variable ($u=[a_{t\_m}^x, a_{t\_m}^y, v_{s\_m}^v, v_{s\_m}^\omega, \theta_s, \theta_t]^T$) is constructed.

Finally, on the basis of the state variable and the input variable, the mathematical model is adjusted to obtain the extended Kalman filter:

$$\begin{cases} \dot{x} = f(x, u, ti) \\ y = h(x, v, ti) \\ v \sim (0, R) \end{cases}$$

where $v$ is a measurement noise vector fitting Gaussian distribution having a mean value of 0 and a covariance of R, ti is time, $\dot{x}=f(x, u, ti)$ is a differential equation model of the system (i.e., an equation 1 of the mathematical model), $y=[s_m^\alpha, s_m^p]$ is an output of the system, and h is a measurement matrix:

$$y = h(x, v, ti) = \begin{bmatrix} 00100000 \\ 00010000 \end{bmatrix} x + 1.$$

In Step S103, the first measurement data is corrected by using the extended Kalman filter.

As an optional implementation, Step S103 includes the steps as follows.

Firstly, the extended Kalman filter is initialized.

Then, the first measurement data is corrected by performing a recursive algorithm, so as to obtain optimal state estimations for $s_m^\alpha$ and $s_m^p$.

As an optional implementation, the extended Kalman filter may be initialized on the basis of the following equations:

$$\hat{x}=E[x(0)]$$

$$P(0)=E[(x(0)-\hat{x}(0))(x(0)-\hat{x}(0))^T],$$

where $\hat{x}(0)$ is an estimation value of an initial state $x(0)$ of the system, $P(0)$ is a transition probability matrix of the state of the system, and $E[\bullet]$ represents an expectation of $\bullet$.

As an optional implementation, the first measurement data may be corrected by performing the recursive algorithm on the basis of the following equation:

$$\dot{\hat{x}}=f(\hat{x},y,ti)+K[y_m-h(x,v_0,ti)].$$

In the above equation, the first item $f(\hat{x}, y, ti)$ part represents 'prediction'. That is, the state of the simulation system is updated by taking the equation (1) as sensor data of a 'driving force' part of the simulation system. The second item $K[y_m-h(x, v_0, ti)]$ represents 'correction'. K is a correction amplitude by which the state of a simulation system is corrected according to an error between the simulation system and an actual system. This correction needs to meet an optimal estimation criterion, and K needs to be continuously updated in accordance with the following equations:

$$\tilde{R}=M(\hat{x})RM(\hat{x})$$

$$K=RC^T(\hat{x})\tilde{R}^{-1}$$

$$\dot{P}=A(\hat{x})P+PA^T(\hat{x})-PC^T(\hat{x})\tilde{R}^{-1}CP,$$

where $\dot{\hat{x}}$ is a derivative of an estimation value of a variable of the state of the system; K a correction amplitude by which the state of a simulation system is corrected according to an error between the simulation system and an actual system; $y_m$ is a measurement result containing noise, including the relative distance $s_m^p$ and the relative angle $s_m^\alpha$ output by the relative position sensor; $\tilde{R}$ is an intermediate variable; P is a propagation probability matrix; and $\dot{P}$ is a derivative of the propagation probability matrix.

$$A = \frac{\partial f}{\partial x}\bigg|_{x=x_0}$$

$$C = \frac{\partial h}{\partial x}\bigg|_{x=x_0}$$

$$M = \frac{\partial h}{\partial v}\bigg|_{x=x_0};$$

The above first-order partial derivative matrix is a matrix for local linearization of a system under a current state, where A is a partial derivative matrix of a state transition function f with respect to a state variable x, C is a partial derivative matrix of a measurement matrix h with respect to a state variable x, and M is a partial derivative matrix of the measurement matrix h with respect to a measurement noise v.

In the above equation, $y_m$ is a measurement result containing noise, including a relative distance and a relative angle output by the relative position sensor. Similar to a traditional state observer, the EKF updates the state by using an input quantity u of a state space equation, and continuously corrects the state variable of the EKF by using offset between an estimation output result and an actual output. Intuitively, compared with a quickly jumping measurement noise, the 'rate' of a correction state is low enough, and compared with a real state change, the 'rate' is high enough. Therefore, a real value may be extracted, almost without delay, from measurement data polluted by the noise.

The technical solution in the embodiment of the disclosure at least has the technical effects or advantages as follows.

In the embodiment of the disclosure, a method for improving performance of a relative position sensor is disclosed, which is applied to a measurement apparatus. The measurement apparatus is configured to measure a relative position between a measured object and the measurement apparatus. A relative position sensor and a first auxiliary sensor are disposed on the measurement apparatus. A second auxiliary sensor is disposed on the measured object. The method includes the steps as follows. First measurement data measured by a relative position sensor is acquired, and second measurement data measured by a first auxiliary sensor and a second auxiliary sensor is acquired. An extended Kalman filter is constructed on the basis of the first measurement data and the second measurement data. The first measurement data is corrected by using the extended Kalman filter. Since the first measurement data measured by the relative position sensor is corrected by using the extended Kalman filter, the technical problems of inaccurate measurement data and poor dynamic performance caused by the fact that measurement data of the relative position sensor is likely to fluctuate due to interference in the conventional art are effectively solved, thereby achieving the technical effect of increasing the accuracy of measurement data of the relative position sensor so as to improve dynamic performance of the relative position sensor.

Embodiment 2

On the basis of the same inventive concept, another embodiment of the disclosure provides a measurement apparatus implementing the method for improving performance of a relative position sensor in the embodiment of the disclosure.

Figure 4:
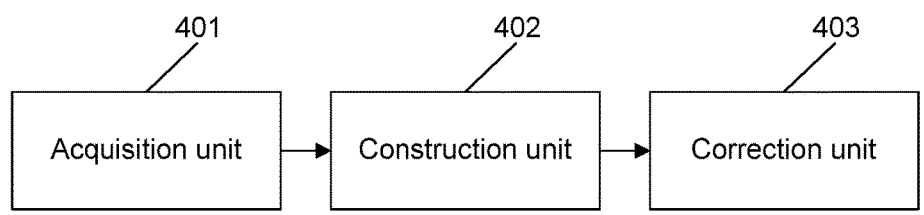
FIG. 4 is a schematic view illustrating a structure of a measurement apparatus according to an embodiment of the disclosure.

As shown in FIG. 4, a measurement apparatus is configured to measure a relative position between a measured object and the measurement apparatus. A relative position sensor and a first auxiliary sensor are disposed on the measurement apparatus. A second auxiliary sensor is disposed on the measured object. The measurement apparatus includes an acquisition unit 401, a construction unit 402 and a correction unit 403.

The acquisition unit 401 is configured to acquire first measurement data measured by a relative position sensor, and acquire second measurement data measured by a first auxiliary sensor and a second auxiliary sensor.

The construction unit 402 is configured to construct an extended Kalman filter on the basis of the first measurement data and the second measurement data.

The correction unit 403 is configured to correct the first measurement data by using the extended Kalman filter.

As an optional implementation, the first measurement data includes:

a relative angle $s_m^\alpha$ between the measurement apparatus and the measured object, and a relative distance $s_m^\rho$ between the measurement apparatus and the measured object.

As an optional implementation, the second measurement data includes:

a component $a_{t\_m}^x$ of an acceleration of the measured object in an X axis, and a component $a_{t\_m}^y$ of the acceleration of the measured object in a Y axis, here, $a_{t\_m}^x$ and $a_{t\_m}^y$ are noise-containing data measured by the second auxiliary sensor (e.g., a gyroscope and/or an accelerometer) disposed on the measured object;

a forward speed $v_{s\_m}^v$ of the measurement apparatus, and a rotation speed $v_{s\_m}^\omega$ of the measurement apparatus, which are noise-containing data measured by the first auxiliary sensor (e.g., a coded disc) disposed on the measurement apparatus; and an angle $\theta_s$ between a positive direction of the measurement apparatus and the Earth's magnetic north pole, and an angle $\theta_t$ between a positive direction of the measured object and the Earth's magnetic north pole, where $\theta_s$ is data measured by the first auxiliary sensor (e.g., an electronic compass) disposed on the measurement apparatus, and $\theta_t$ is data measured by the second auxiliary sensor (e.g., an electronic compass) disposed on the measured object.

As an optional implementation, the measurement apparatus further includes a modelling unit.

The modelling unit is configured to mathematically model, before the EKF is constructed on the basis of the first measurement data and the second measurement data, a system consisting of the measurement apparatus and the measured object to obtain a mathematical model:

$$\begin{cases} \dot{v}_t^x = a_{t\_m}^x - b_t^x \\ \dot{v}_t^y = a_{t\_m}^y - b_t^y \\ \dot{s}_m^\alpha = r_s^\omega v_{s\_m}^\omega + \frac{v_{s\_p}^y - v_{t\_p}^y}{s_m^\rho} \\ \dot{s}_m^\rho = v_{s\_p}^x + v_{t\_p}^x \\ \begin{bmatrix} v_{t\_p}^x \\ v_{t\_p}^y \end{bmatrix} = T(s_m^\alpha - \theta_s - \theta_t) \begin{bmatrix} v_t^x \\ v_t^y \end{bmatrix} \\ \begin{bmatrix} v_{sp}^x \\ v_{sp}^y \end{bmatrix} = r_s^v \begin{bmatrix} v_t^x \cos s_m^\alpha \\ v_t^y \sin s_m^\alpha \end{bmatrix} \\ \dot{b}_t^x = 0 \\ \dot{b}_t^y = 0 \\ \dot{r}_s^\omega = 0 \\ \dot{r}_s^v = 0 \end{cases}$$

where $b_t^x$ is a bias of the acceleration of the measured object in the X axis, and $b_t^y$ is a bias of the acceleration of the measured object in the Y axis.

$r_s^v$ is a ratio of a forward speed, measured by the first auxiliary sensor (e.g., a coded disc or a light flow sensor), of the measurement apparatus to an actual forward speed of the measurement apparatus, and $r_s^\omega$ is a ratio of a rotation speed, measured by the first auxiliary sensor (e.g., the coded disc or the light flow sensor), of the measurement apparatus to an actual rotation speed of the measurement apparatus. Here, generally, $r_s^v$ and $r_s^\omega$ are not equal to 1, are correlated to a wheel diameter and interval of the measurement apparatus, and may reflect the change in the geometric size of the measurement apparatus.

$v_t^x$ is a component of a speed, along a pointing direction of the second auxiliary sensor (e.g., an IMU disposed on the measured object), of the measured object in the X axis, and $v_t^y$ is a component of the speed, along the pointing direction of the second auxiliary sensor (e.g., the IMU disposed on the measured object), of the measured object in the Y axis ($v_t^x$ coincides with $a_{t\_m}^x$ in FIG. 2, and $v_t^y$ coincides with $a_{t\_m}^y$ in FIG. 2).

$v_{s\_p}^x$ is a magnitude of a projection of a forward speed vector of the measurement apparatus onto a direction of a radius vector of the measurement apparatus and the measured object, and $v_{s\_p}^y$ is a magnitude of a projection of the forward speed vector of the measurement apparatus onto a direction normal to the radius vector direction of the measurement apparatus and the measured object.

$v_{t\_p}^x$ is a magnitude of a projection of a speed vector of the measured object onto a direction of a radius vector connecting the measurement apparatus and the measured object, and $v_{t\_p}^y$ is a magnitude of a projection of the speed vector of the measured object onto a direction normal to the radius vector direction connecting the measurement apparatus and the measured object.

$T(\bullet)$ is a rotation transformation matrix in a two-dimensional space, which represents that a vector post-multiplied the rotation transformation matrix is rotated anticlockwise by $(\bullet)$.

As an optional implementation, the construction unit 402 is specifically configured to:

construct a state variable ($x=[v_t^x, v_t^y, s^\alpha, v^\rho, b_t^x, b_t^y, r_s^v, r_s^\omega]^T$);

construct an input variable ($u=[a_{t\_m}^x, a_{t\_m}^y, v_{s\_m}^v, v_{s\_m}^\omega, \theta_s, \theta_t]^T$); and adjust, on the basis of the state variable and the input variable, the mathematical model to the following expression, so as to obtain the EKF:

$$\begin{cases} \dot{x} = f(x, u, ti) \\ y = h(x, v, ti) \\ v \sim (0, R) \end{cases}$$

where $v$ is a measurement noise vector fitting Gaussian distribution having a mean value of 0 and a covariance of R, ti is time, $\dot{x}=f(x, u, ti)$ is a differential equation model of the system (i.e., an equation 1 of the mathematical model), $y=[s_m^\alpha, s_m^\rho]$ is an output of the system, and h is a measurement matrix:

$$y = h(x, v, ti) = \begin{bmatrix} 00100000 \\ 00010000 \end{bmatrix} x + 1.$$

As an optional implementation, the correction unit 403 is specifically configured to:

initialize the extended Kalman filter; and correct the first measurement data by executing a recursive algorithm, so as to obtain optimal state estimations for $s_m^\alpha$ and $s_m^\rho$.

As an optional implementation, the correction unit 403 is specifically configured to initialize the extended Kalman filter on the basis of the following equations:

$$\hat{x}=E[x(0)]$$

$$P(0)=E[(x(0)-\hat{x}(0))(x(0)-\hat{x}(0))^T],$$

where $\hat{x}(0)$ is an estimation value of an initial state x(0) of the system, P(0) is a transition probability matrix of the state of the system, and E[•] represents an expectation of •.

As an optional implementation, the correction unit 403 is specifically configured to correct the first measurement data by executing the recursive algorithm on the basis of the following equation:

$$\dot{\hat{x}}=f(\hat{x},y,ti)+K[y_m-h(x,v_0,ti)].$$

In the above equation, the first item $f(\hat{x}, y, ti)$ part represents 'prediction'. That is, the state of the simulation system is updated by taking the equation (1) as sensor data of a 'driving force' part of the simulation system. The second item $K[y_m-h(x, v_0, ti)]$ represents 'correction'. K represents a correction amplitude by which the state of a simulation system is corrected according to an error between the simulation system and an actual system. This correction needs to meet an optimal estimation criterion, and K needs to be continuously updated in accordance with the following equations:

$$\tilde{R}=M(\hat{x})RM(\hat{x})$$

$$K=RC^T(\hat{x})\tilde{R}^{-1}$$

$$\dot{P}=A(\hat{x})P+PA^T(\hat{x})-PC^T(\hat{x})\tilde{R}^{-1}CP,$$

where $\dot{\hat{x}}$ is a derivative of an estimation value of a variable of the state of the system; K is a correction amplitude by which the state of a simulation system is corrected according to an error between the simulation system and an actual system; $y_m$ is a measurement result containing noise, including the relative distance $s_m^\rho$ and the relative angle $s_m^\alpha$ output by the relative position sensor; $\tilde{R}$ is an intermediate variable; P is a propagation probability matrix; and $\dot{P}$ is a derivative of the propagation probability matrix.

$$A = \frac{\partial f}{\partial x}\Big|_{x=x_0}$$

$$C = \frac{\partial h}{\partial x}\Big|_{x=x_0}$$

$$M = \frac{\partial h}{\partial v}\Big|_{x=x_0}.$$

The above first-order partial derivative matrix is a matrix for local linearization of a system under a current state, where A is a partial derivative matrix of a state transition function f with respect to a state variable x, C is a partial derivative matrix of a measurement matrix h with respect to a state variable x, and M is a partial derivative matrix of the measurement matrix h with respect to a measurement noise v.

Since the measurement apparatus introduced in this embodiment is an apparatus adopted for implementing the method for improving performance of a relative position sensor in the embodiment of the disclosure, on the basis of the method for improving performance of a relative position sensor introduced in the embodiment of the disclosure, those skilled in the art can know a specific implementation and various variation of the measurement apparatus of this embodiment. Thus, how to implement the method in the embodiment of the disclosure by the measurement apparatus will be no longer introduced herein in detail. Any apparatuses adopted for implementing the method for improving performance of a relative position sensor in the embodiment of the disclosure will fall within the protection scope of the disclosure.

The technical solution in the embodiment of the disclosure at least has the technical effects or advantages as follows.

In the embodiment of the disclosure, a measurement apparatus is disclosed. The measurement apparatus is configured to measure a relative position between a measured object and the measurement apparatus. A relative position sensor and a first auxiliary sensor are disposed on the measurement apparatus. A second auxiliary sensor is disposed on the measured object. The measurement apparatus includes: an acquisition unit configured to acquire first measurement data measured by a relative position sensor, and acquire second measurement data measured by a first auxiliary sensor and a second auxiliary sensor; a construction unit configured to construct an EKF on the basis of the first measurement data and the second measurement data; and a correction unit configured to correct the first measurement data by using the EKF. Since the first measurement data measured by the relative position sensor is corrected by using the extended Kalman filter, the technical problems of inaccurate measurement data and poor dynamic performance caused by the fact that measurement data of the relative position sensor is likely to fluctuate due to interference in the conventional art are effectively solved, thereby achieving the technical effect of increasing the accuracy of measurement data of the relative position sensor so as to improve dynamic performance of the relative position sensor.

Another embodiment of the disclosure provides a computer storage medium storing computer-executable instructions configured to:

acquire first measurement data measured by a relative position sensor, and acquire second measurement data measured by a first auxiliary sensor and a second auxiliary sensor;

construct an EKF on the basis of the first measurement data and the second measurement data; and correct the first measurement data by using the EKF.

Furthermore, processing executed by the computer storage medium is the same as processing in the embodiment 1, which will not be elaborated herein.

Those skilled in the art shall understand that the embodiments of the disclosure may be provided as a method, a system or a computer program product. Thus, forms of hardware embodiments, software embodiments or embodiments integrating software and hardware may be adopted in the disclosure. Moreover, a form of the computer program product implemented on one or more computer available storage media (including, but are not limited to, a disk memory, a Compact Disc Read-Only Memory (CD-ROM) an optical memory and the like) containing computer available program codes may be adopted in the disclosure.

The disclosure is described with reference to flow charts and/or block diagrams of the method, the device (system) and the computer program product according to the embodiments of the disclosure. It will be understood that each flow and/or block in the flow charts and/or the block diagrams and a combination of the flows and/or the blocks in the flow charts and/or the block diagrams may be implemented by computer program instructions. These computer program instructions may be provided for a general computer, a dedicated computer, an embedded processor or processors of other programmable data processing devices to generate a machine, such that an apparatus for implementing functions designated in one or more flows of the flow charts and/or one or more blocks of the block diagrams is generated via instructions executed by the computers or the processors of the other programmable data processing devices.

These computer program instructions may also be stored in a computer readable memory capable of guiding the computers or the other programmable data processing devices to work in a specific manner, such that a manufactured product including an instruction apparatus is generated via the instructions stored in the computer readable memory, and the instruction apparatus implements the functions designated in one or more flows of the flow charts and/or one or more blocks of the block diagrams.

These computer program instructions may also be loaded to the computers or the other programmable data processing devices, such that processing implemented by the computers is generated by executing a series of operation steps on the computers or the other programmable devices, and therefore the instructions executed on the computers or the other programmable devices provide a step of implementing the functions designated in one or more flows of the flow charts and/or one or more blocks of the block diagrams.

Although the preferred embodiments of the disclosures have been described, once those skilled in the art obtains a basic creativity concept, those skilled in the art may change and modify these embodiments additionally. Thus, the appended claims are intended to be interpreted as all changes and modifications including the preferred embodiments and falling within the scope of the disclosure.

Apparently, those skilled in the art may make various modifications and transformations on the disclosure without departing from the spirit and scope of the disclosure. Thus, if these modifications and transformations on the disclosure fall within the scope of the claims and equivalent technologies of the disclosure, the disclosure is also intended to include these modifications and transformations.

INDUSTRIAL APPLICABILITY

The embodiment of the disclosure provides a method for improving performance of a relative position sensor. The method includes the steps as follows. First measurement data measured by a relative position sensor is acquired, and second measurement data measured by a first auxiliary sensor and a second auxiliary sensor is acquired. An EKF is constructed on the basis of the first measurement data and the second measurement data. The first measurement data is corrected by using the EKF. Since the first measurement data measured by the relative position sensor is corrected by using the EKF, the technical problems of inaccurate measurement data and poor dynamic performance caused by the fact that measurement data of the relative position sensor is likely to fluctuate due to interference in the conventional art are effectively solved, thereby achieving the technical effect of increasing the accuracy of measurement data of the relative position sensor so as to improve dynamic performance of the relative position sensor.

What is claimed is:

1. A method for improving performance of a relative position sensor, the method being applied to a measurement apparatus configured to measure a relative position between a measured object and the measurement apparatus, the relative position sensor and a first auxiliary sensor being disposed on the measurement apparatus, and a second auxiliary sensor being disposed on the measured object, the method comprising:

acquiring first measurement data measured by the relative position sensor, acquiring second measurement data measured by the first auxiliary sensor, and acquiring third measurement data measured by the second auxiliary sensor;

constructing an Extended Kalman Filter (EKF) on the basis of the first measurement data, the second measurement data, and the third measurement data; and correcting the first measurement data by using the EKF;

wherein the first measurement data comprises: a relative angle $s_m^a$ between the measurement apparatus and the measured object, and a relative distance $s_m^p$ between the measurement apparatus and the measured object;

the second measurement data comprises: a forward speed $v_{s\_m}^v$ of the measurement apparatus, a rotation speed $v_{s\_m}^\omega$ of the measurement apparatus, and an angle $\theta_s$ between a positive direction of the measurement apparatus and a magnetic north pole of Earth;

the third measurement data comprises: a component $a_{t\_m}^x$ of an acceleration of the measured object in an X axis, a component $a_{t\_m}^y$ of the acceleration of the measured object in a Y axis, and an angle $\theta_t$ between a positive direction of the measured object and the magnetic north pole of Earth; and wherein before the EKF is constructed on the basis of the first measurement data, the second measurement data, and the third measurement data, the method further comprises:

mathematically modelling a system consisting of the measurement apparatus and the measured object to obtain a mathematical model:

$$\begin{cases} \dot{v}_t^x = a_{t\_m}^x - b_t^x \\ \dot{v}_t^y = a_{t\_m}^y - b_t^y \\ \dot{s}_m^\alpha = r_s^\omega v_{s\_m}^\omega + \dfrac{v_{s\_p}^y - v_{t\_p}^y}{s_m^\rho} \\ \dot{s}_m^\rho = v_{s\_p}^x + v_{t\_p}^x \\ \begin{bmatrix} v_{t\_p}^x \\ v_{t\_p}^y \end{bmatrix} = T(s_m^\alpha - \theta_s - \theta_t) \begin{bmatrix} v_t^x \\ v_t^y \end{bmatrix}, \\ \begin{bmatrix} v_{s\_p}^x \\ v_{s\_p}^y \end{bmatrix} = r_s^v \begin{bmatrix} v_t^x \cos s_m^\alpha \\ v_t^y \sin s_m^\alpha \end{bmatrix} \\ \dot{b}_t^x = 0 \\ \dot{b}_t^y = 0 \\ \dot{r}_s^\omega = 0 \\ \dot{r}_s^v = 0 \end{cases}$$

where $b_t^x$ is a bias of the acceleration of the measured object in the X axis, and $b_t^y$ is a bias of the acceleration of the measured object in the Y axis;

$r_s^v$ is a ratio of a forward speed, measured by the first auxiliary sensor, of the measurement apparatus to an actual forward speed of the measurement apparatus, and $r_s^\omega$ if is a ratio of a rotation speed, measured by the first auxiliary sensor, of the measurement apparatus to an actual rotation speed of the measurement apparatus;

$v_t^x$ is a component of a speed, along a pointing direction of the second auxiliary sensor, of the measured object in the X axis, and $v_t^y$ is a component of the speed, along the pointing direction of the second auxiliary sensor, of the measured object in the Y axis;

$v_{s\_p}^x$ is a magnitude of a projection of a forward speed vector of the measurement apparatus onto a direction of a radius vector of the measurement apparatus and the measured object, and $v_{s\_p}^y$, is a magnitude of a projection of the forward speed vector of the measurement apparatus onto a direction normal to the direction of the radius vector of the measurement apparatus and the measured object;

$v_{t\_p}^x$ is a magnitude of a projection of a speed vector of the measured object onto a direction of a radius vector connecting the measurement apparatus and the measured object, and $v_{t\_p}^y$ is a magnitude of a projection of the speed vector of the measured object onto a direction normal to the direction of the radius vector connecting the measurement apparatus and the measured object; and T(•) is a rotation transformation matrix in a two-dimensional space.

2. The method for improving performance of a relative position sensor according to claim 1, wherein constructing the EKF on the basis of the first measurement data, the second measurement data, and the third measurement data comprises:

constructing a state variable ($x=[v_t^x,v_t^y,s_m^\alpha,s_m^\rho,b_t^x,b_t^y,r_s^v,r_s^\omega]^T$);

constructing an input variable ($u=[a_{t\_m}^x,a_{t\_m}^y,v_{s\_m}^v,v_{s\_m}^\omega,\theta_s,\theta_t]^T$); and adjusting, on the basis of the state variable and the input variable, the mathematical model to obtain the EKF:

$$\begin{cases} \dot{x} = f(x, u, ti) \\ y = h(x, v, ti), \\ v \sim (0, R) \end{cases}$$

where v is a measurement noise vector fitting Gaussian distribution having a mean value of 0 and a covariance of R, ti is time, $\dot{x}=f(x,u,ti)$ is a differential equation model of the system, $y=[s_m^\alpha,s_m^\rho]$ is an output of the system, and h is a measurement matrix.

3. The method for improving performance of a relative position sensor according to claim 2, wherein correcting the first measurement data by using the EKF comprises:

initializing the EKF; and correcting the first measurement data by executing a recursive algorithm, so as to obtain optimal state estimations for $s_m^\alpha$ and $s_m^\rho$.

4. The method for improving performance of a relative position sensor according to claim 3, wherein initializing the EKF comprises:

initializing the EKF on the basis of the following equations:

$\hat{x}=E[x(0)]$ $P(0)=E[(x(0)-\hat{x}(0))(x(0)-\hat{x}(0))^T]$, where $\hat{x}(0)$ is an estimation value of an initial state $x(0)$ of the system, $P(0)$ is a transition probability matrix of a state of the system, and E[•] represents an expectation of •.

5. The method for improving performance of a relative position sensor according to claim 4, wherein correcting the first measurement data by executing the recursive algorithm comprises:

correcting the first measurement data by executing the recursive algorithm on the basis of the following equation:

$\dot{\hat{x}}=f(\hat{x},y,ti)+K[y_m-h(x,v_0,ti)]$, where K is continuously updated in accordance with the following equations:

$\tilde{R} = M(\hat{x})RM(\hat{x})$ $K = RC^T(\hat{x})\tilde{R}^{-1}$ $\dot{P} = A(\hat{x})P + PA^T(\hat{x}) - PC^T(\hat{x})\tilde{R}^{-1}CP$ where $A = \dfrac{\partial f}{\partial x}\bigg|_{x=x_0}$ $C = \dfrac{\partial h}{\partial x}\bigg|_{x=x_0}$ $M = \dfrac{\partial h}{\partial v}\bigg|_{x=x_0}$;

$\dot{\hat{x}}$ is a derivative of an estimation value of a variable of the state of the system; K is a correction amplitude by which a state of a simulation system is corrected according to an error between the simulation system and an actual system; $y_m$ is a measurement result containing noise, comprising the relative distance $s_m^\rho$ and the relative angle $s_m^\alpha$ a output by the relative position sensor; $\tilde{R}$ is an intermediate variable; P is a propagation probability matrix; and $\dot{P}$ is a derivative of the propagation probability matrix.

6. A measurement apparatus configured to measure a relative position between a measured object and the measurement apparatus, a relative position sensor and a first auxiliary sensor being disposed on the measurement apparatus, and a second auxiliary sensor being disposed on the measured object, the measurement apparatus comprising:
an acquisition unit configured to acquire first measurement data measured by the relative position sensor, acquire second measurement data measured by the first auxiliary sensor, and acquire third measurement data measured by the second auxiliary sensor;
a construction unit configured to construct an Extended Kalman Filter (EKF) on the basis of the first measurement data, the second measurement data, and the third measurement data; and
a correction unit configured to correct the first measurement data by using the EKF;
wherein the first measurement data comprises: a relative angle $s_m^\alpha$ between the measurement apparatus and the measured object, and a relative distance $s_m^\rho$ between the measurement apparatus and the measured object;
the second measurement data comprises: a forward speed $v_{s\_m}^v$ of the measurement apparatus, a rotation speed $v_{s\_m}^\omega$ of the measurement apparatus, and an angle $\theta_s$ between a positive direction of the measurement apparatus and a magnetic north pole of Earth;
the third measurement data comprises: a component $a_{t\_m}^x$ of an acceleration of the measured object in an X axis, a component $a_{t\_m}^y$ of the acceleration of the measured object in a Y axis, and an angle $\theta_t$ between a positive direction of the measured object and the magnetic north pole of Earth; and
the measurement apparatus further comprising: a modelling unit configured to mathematically model, before the EKF is constructed on the basis of the first measurement data, the second measurement data, and the third measurement data, a system consisting of the measurement apparatus and the measured object to obtain a mathematical model:

$$\begin{cases} \dot{v}_t^x = a_{t\_m}^x - b_t^x \\ \dot{v}_t^y = a_{t\_m}^y - b_t^y \\ \dot{s}_m^\alpha = r_s^\omega v_{s\_m}^\omega + \dfrac{v_{s\_p}^y - v_{t\_p}^y}{s_m^\rho} \\ \dot{s}_m^\rho = v_{s\_p}^x + v_{t\_p}^x \\ \begin{bmatrix} v_{t\_p}^x \\ v_{t\_p}^y \end{bmatrix} = T(s_m^\alpha - \theta_s - \theta_t) \begin{bmatrix} v_t^x \\ v_t^y \end{bmatrix}, \\ \begin{bmatrix} v_{s\_p}^x \\ v_{s\_p}^y \end{bmatrix} = r_s^v \begin{bmatrix} v_t^x \cos s_m^\alpha \\ v_t^y \sin s_m^\alpha \end{bmatrix} \\ \dot{b}_t^x = 0 \\ \dot{b}_t^y = 0 \\ \dot{r}_s^\omega = 0 \\ \dot{r}_s^v = 0 \end{cases}$$

where $b_t^x$ is a bias of the acceleration of the measured object in the X axis, and $b_t^y$ is a bias of the acceleration of the measured object in the Y axis;
$r_s^v$ is a ratio of a forward speed, measured by the first auxiliary sensor, of the measurement apparatus to an actual forward speed of the measurement apparatus, and $r_s^\omega$ is a ratio of a rotation speed, measured by the first auxiliary sensor, of the measurement apparatus to an actual rotation speed of the measurement apparatus;
$v_t^x$ is a component of a speed, along a pointing direction of the second auxiliary sensor, of the measured object in the X axis, and $v_t^y$ is a component of the speed, along the pointing direction of the second auxiliary sensor, of the measured object in the Y axis;
$v_{s\_p}^x$ is a magnitude of a projection of a forward speed vector of the measurement apparatus onto a direction of a radius vector of the measurement apparatus and the measured object, and $v_{s\_p}^y$ is a magnitude of a projection of the forward speed vector of the measurement apparatus onto a direction normal to the direction of the radius vector of the measurement apparatus and the measured object;
$v_{t\_p}^x$ is a magnitude of a projection of a speed vector of the measured object onto a direction of a radius vector connecting the measurement apparatus and the measured object, and $v_{t\_p}^y$ is a magnitude of a projection of the speed vector of the measured object onto a direction normal to the direction of the radius vector connecting the measurement apparatus and the measured object; and
T(•) is a rotation transformation matrix in a two-dimensional space.

7. The measurement apparatus according to claim 6, wherein the construction unit is configured to:
construct a state variable ($x=[v_t^x, v_t^y, s_m^\alpha, s_m^\rho, b_t^x, b_t^y, r_s^v, r_s^\omega]^T$;
construct an input variable $u=[a_{t\_m}^x, a_{t\_m}^y, v_{s\_m}^v, v_{s\_m}^\omega, \theta_s, \theta_t]^T$); and
adjust, on the basis of the state variable and the input variable, the mathematical model to obtain the EKF:

$$\begin{cases} \dot{x} = f(x, u, ti) \\ y = h(x, v, ti) , \\ v \sim (0, R) \end{cases}$$

where v is a measurement noise vector fitting Gaussian distribution having a mean value of 0 and a covariance of R, ti is time, $\dot{x}=f(x,u,ti)$ is a differential equation model of the system, $y=[s_m^\alpha, s_m^\rho]$ is an output of the system, and h is a measurement matrix.

8. The measurement apparatus according to claim 7, wherein the correction unit is configured to:
correct the first measurement data by executing a recursive algorithm, so as to obtain optimal state estimations for $s_m^\alpha$ and $s_m^\rho$.

9. The measurement apparatus according to claim 8, wherein the correction unit is configured to initialize the EKF on the basis of the following equations:

$\hat{x}=E[x(0)]$ $P(0)=E[(x(0)-\hat{x}(0))(x(0)-\hat{x}(0))^T]$, where $\hat{x}(0)$ is an estimation value of an initial state x(0) of the system, P(0) is a transition probability matrix of a state of the system, and E[•] represents an expectation of •.

10. The measurement apparatus according to claim 9, wherein the correction unit is configured to correct the first measurement data by executing the recursive algorithm on the basis of the following equation:

$\dot{\hat{x}}=f(\hat{x},y,ti)+K[y_m-h(x,v_0,ti)]$, where K is continuously updated in accordance with the following equations:

$$\tilde{R} = M(\hat{x})RM(\hat{x})$$
$$K = RC^T(\hat{x})\tilde{R}^{-1}$$
$$\dot{P} = A(\hat{x})P + PA^T(\hat{x}) - PC^T(\hat{x})\tilde{R}^{-1}CP$$

where $$A = \frac{\partial f}{\partial x}\bigg|_{x=x_0}$$
$$C = \frac{\partial h}{\partial x}\bigg|_{x=x_0}$$
$$M = \frac{\partial h}{\partial v}\bigg|_{x=x_0};$$

$\hat{x}$ is a derivative of an estimation value of a variable of the state of the system; K is a correction amplitude by which a state of a simulation system is corrected according to an error between the simulation system and an actual system; $y_m$ is a measurement result containing noise, comprising the relative distance $s_m^\rho$ and the relative angle $s_m^\alpha$ output by the relative position sensor; $\tilde{R}$ is an intermediate variable; P is a propagation probability matrix; and $\dot{P}$ is a derivative of the propagation probability matrix.

11. A non-transitory computer storage medium storing computer-executable instructions configured to:
acquire first measurement data measured by a relative position sensor, acquire second measurement data measured by a first auxiliary sensor, and acquire third measurement data measured by a second auxiliary sensor;
construct an Extended Kalman Filter (EKF) on the basis of the first measurement data, the second measurement data, and the third measurement data; and
correct the first measurement data by using the EKF;
wherein the first measurement data comprises: a relative angle $s_m^\alpha$ between the measurement apparatus and the measured object, and a relative distance $s_m^\rho$ between the measurement apparatus and the measured object;
the second measurement data comprises: a forward speed $v_{s\_m}^v$ of the measurement apparatus, a rotation speed $v_{s\_m}^\omega$ of the measurement apparatus, and an angle $\theta_s$, between a positive direction of the measurement apparatus and a magnetic north pole of Earth; and
the third measurement data comprises: a component $a_{t\_m}^x$ of an acceleration of the measured object in an X axis, a component $a_{t\_m}^y$ of the acceleration of the measured object in a Y axis, and an angle $\theta_t$ between a positive direction of the measured object and the magnetic north pole of Earth; and
wherein, before the EKF is constructed on the basis of the first measurement data, the second measurement data, and the third measurement data, the computer-executable instructions are further configured to mathematically model a system consisting of the measurement apparatus and the measured object to obtain a mathematical model:

$$\begin{cases} \dot{v}_t^x = a_{t\_m}^x - b_t^x \\ \dot{v}_t^y = a_{t\_m}^y - b_t^y \\ \dot{s}_m^\alpha = r_s^\omega v_{s\_m}^\omega + \dfrac{v_{s\_p}^y - v_{t\_p}^y}{s_m^\rho} \\ \dot{s}_m^\rho = v_{s\_p}^x + v_{t\_p}^x \\ \begin{bmatrix} v_{t\_p}^x \\ v_{t\_p}^y \end{bmatrix} = T(s_m^\alpha - \theta_s - \theta_t)\begin{bmatrix} v_t^x \\ v_t^y \end{bmatrix}, \\ \begin{bmatrix} v_{s\_p}^x \\ v_{s\_p}^y \end{bmatrix} = r_s^v \begin{bmatrix} v_t^x \cos s_m^\alpha \\ v_t^y \sin s_m^\alpha \end{bmatrix} \\ \dot{b}_t^x = 0 \\ \dot{b}_t^y = 0 \\ \dot{r}_s^\omega = 0 \\ \dot{r}_s^v = 0 \end{cases}$$

where $b_t^x$ is a bias of the acceleration of the measured object in the X axis, and $b_t^Y$ is a bias of the acceleration of the measured object in the Y axis;
$r_s^v$ is a ratio of a forward speed, measured by the first auxiliary sensor, of the measurement apparatus to an actual forward speed of the measurement apparatus, and $r_s^\omega$ is a ratio of a rotation speed, measured by the first auxiliary sensor, of the measurement apparatus to an actual rotation speed of the measurement apparatus;
$v_t^x$ is a component of a speed, along a pointing direction of the second auxiliary sensor, of the measured object in the X axis, and $v_t^y$ is a component of the speed, along the pointing direction of the second auxiliary sensor, of the measured object in the Y axis;
$v_{s\_p}^x$ is a magnitude of a projection of a forward speed vector of the measurement apparatus onto a direction of a radius vector of the measurement apparatus and the measured object, and $v_{s\_p}^y$ is a magnitude of a projection of the forward speed vector of the measurement apparatus onto a direction normal to the direction of the radius vector of the measurement apparatus and the measured object;
$v_{t\_p}^x$ is a magnitude of a projection of a speed vector of the measured object onto a direction of a radius vector connecting the measurement apparatus and the measured object, and $v_{t\_p}^Y$ is a magnitude of a projection of the speed vector of the measured object onto a direction normal to the direction of the radius vector connecting the measurement apparatus and the measured object; and
T(•) is a rotation transformation matrix in a two-dimensional space.

* * * * *